US010853360B2

(12) United States Patent
Harmsen et al.

(10) Patent No.: US 10,853,360 B2
(45) Date of Patent: *Dec. 1, 2020

(54) SEARCHABLE INDEX

(71) Applicant: Google LLC, Mountain View, CA (US)

(72) Inventors: Jeremiah Harmsen, Zurich (CH); Tushar Deepak Chandra, Los Altos, CA (US); Marcus Fontoura, Bellevue, WA (US)

(73) Assignee: Google LLC, Mountain View, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 16/366,260

(22) Filed: Mar. 27, 2019

(65) Prior Publication Data

US 2019/0220460 A1 Jul. 18, 2019

Related U.S. Application Data

(63) Continuation of application No. 14/268,049, filed on May 2, 2014, now Pat. No. 10,255,319.

(51) Int. Cl.
*G06F 16/31* (2019.01)
*G06F 16/245* (2019.01)
*G06N 20/00* (2019.01)
*G06F 16/22* (2019.01)
*G06N 5/02* (2006.01)

(52) U.S. Cl.
CPC ........ *G06F 16/245* (2019.01); *G06F 16/2228* (2019.01); *G06F 16/319* (2019.01); *G06N 5/025* (2013.01); *G06N 20/00* (2019.01)

(58) Field of Classification Search
CPC .... G06F 16/245; G06F 16/2228; G06N 20/00
See application file for complete search history.

(56) References Cited

U.S. PATENT DOCUMENTS

| 7,222,127 | B1 | 5/2007 | Bem et al. |
| 2008/0072134 | A1 | 3/2008 | Balakrishnan et al. |
| 2008/0133473 | A1 | 6/2008 | Broder et al. |
| 2009/0164437 | A1 | 6/2009 | Torbjornsen |
| 2011/0022450 | A1 | 1/2011 | Meredith |
| 2011/0047028 | A1* | 2/2011 | Kim .................. G06Q 30/0256 |
| | | | 705/14.52 |

(Continued)

FOREIGN PATENT DOCUMENTS

EP 2407900 1/2012

OTHER PUBLICATIONS

EP Office Action issued in European Application No. 15165975.2 dated May 20, 2016, 7 pages.

(Continued)

*Primary Examiner* — Loc Tran
(74) *Attorney, Agent, or Firm* — Fish & Richardson P.C.

(57) ABSTRACT

Systems and techniques are disclosed for generating entries for a searchable index based on rules generated by one or more machine-learned models. The index entries can include one or more tokens correlated with an outcome and an outcome probability. A subset of tokens can be identified based on the characteristics of an event. The index may be searched for outcomes and their respective probabilities that correspond to tokens that are similar to or match the subset of tokens based on the event.

20 Claims, 3 Drawing Sheets

(56) References Cited

U.S. PATENT DOCUMENTS

2011/0054999 A1* 3/2011 Attenberg .......... G06Q 30/0251
    705/14.43
2012/0209795 A1    8/2012 Glickman
2014/0244621 A1    8/2014 Lindsay

OTHER PUBLICATIONS

EP Office Action issued in European Application No. 15165975.2, dated Jul. 24, 2017, 20 pages.
Extended European Search Report issued in European Application No. 15165975.2 dated Aug. 21, 2015, 7 pages.
He et al., "Scalable Similarity Search with Optimized Kernel Hashing," Proceedings of the 16th ACM SIGKDD international conference on Knowledge discovery and data mining, Jul. 25-28, 2010, pp. 1129-1138.
Parthasarathy et al., "Custom Memory Placement for Parallel Data Mining," Technical Report, The University of Rochester, Nov. 1997, 25 pages.
Wang et al., "Semi-Supervised Hashing for Large-Scale Search," IEEE Transactions on Pattern Analysis and Machine Intelligence, 34(12):2393-2406, Dec. 2012.
EP Office Action in European Application No. 15165975.2, dated Mar. 1, 2020, 15 pages.
CN Office Action Issued in Chinese Application No. 201510221966.2 dated Apr. 3, 2019, 18 pages (with English translation).

* cited by examiner though the information retrieval tool is less accurate, it can exclude certain candidates from consideration using the machine-learned model that would otherwise be highly ranked.

SEARCHABLE INDEX

CROSS-REFERENCE TO RELATED APPLICATION

This application is a continuation of U.S. application Ser. No. 14/268,049, filed May 2, 2014, the contents of which are incorporated by reference herein.

BACKGROUND

Recommendation systems can have separate information retrieval and machine-learned ranking stages. The information retrieval stage selects documents (videos, advertisements, music, text documents, etc.) from a corpus based on various signals and the machine-learned system ranks the output of the information retrieval system. For example, when a user enters a query "cat", a contextual information retrieval system may select a set of candidate advertisements that contain the word "cat" from all available advertisements. This set of candidate advertisements can then be ranked based on a machine-learned model that has been trained to predict the likelihood of an advertisement being clicked through by a user based on various features, such as the type of user, the location of the user, the time of day at which the query was made, etc. An information retrieval tool is computationally efficient, but can only produce a rough estimate of which items are best recommended to a user. A machine-learned model can produce more accurate recommendations, but is often more computationally intensive than an information retrieval tool. Further, because the information retrieval tool is less accurate, it can exclude certain candidates from consideration using the machine-learned model that would otherwise be highly ranked.

BRIEF SUMMARY

According to implementations of the disclosed subject matter, a plurality of rules from a machine learning model may be generated by a computerized machine learning system and received, each rule containing an outcome, one or more features, and an outcome probability predicted by the machine learning model for the one or more features and the outcome. An entry for a token-based index may be generated for each of the plurality of rules and may contain one or more tokens based on the one or more features of the rule, the outcome of the rule, and the outcome probability of the rule. A query may be received and a subset of tokens that correspond to the query may be identified. The token-based index may be searched to obtain a plurality of outcome probabilities based on the subset of tokens. An outcome may be selected based on the plurality of outcome probabilities and may be provided to a user. A subset of selected outcomes may be ranked. For example, a hundred videos (outcomes) may be ranked by probability and the top twenty may be shown, from highest to lowest probability, to the user.

Systems and techniques according to the present disclosure may generate or modify one or more indices based on rules and results of a model that is the product of a machine learning system. The generated or modified indices may be used to provide results based on a search technique. Additional characteristics, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
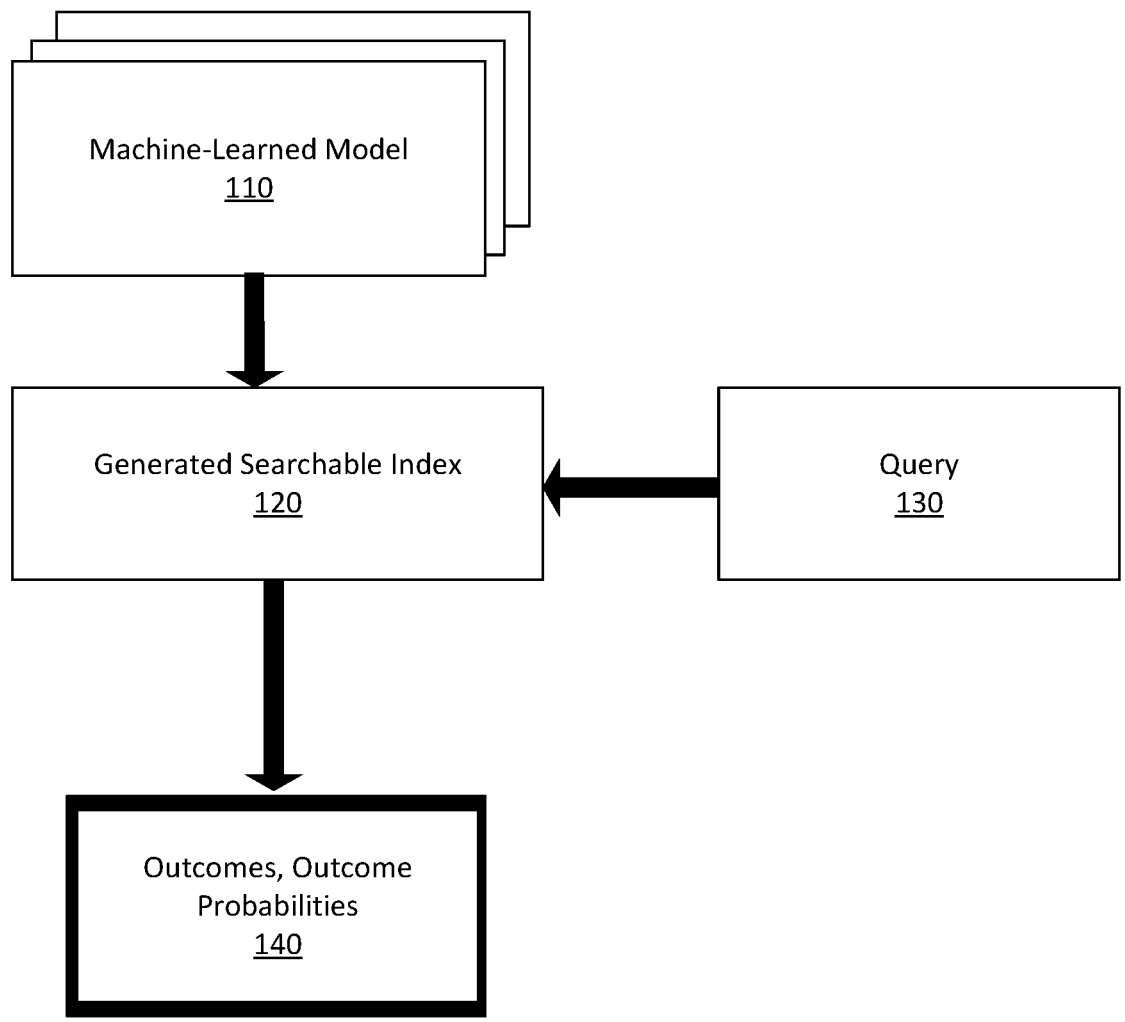
FIG. 1 shows an example illustration for providing outcomes/outcome probabilities via a token-based index, according to an implementation of the disclosed subject matter.

According to implementations of the disclosed subject matter, a searchable index may be generated based on rules derived from a machine-learned model. In this way, the superior intelligence and logic of a machine-learned model can be embodied in an easily-searchable index. Standard information retrieval tools can be used to efficiently retrieve data using the index. This can compare favorably to a system that has separate information retrieval and machine-learned ranking stages by eliminating the loss of candidates during the information retrieval stage that would otherwise be highly scored by the machine-learned model. Overall, more candidates can be more accurately ranked in accordance with an implementation of the disclosed subject matter.

The techniques disclosed herein may be applied to machine-learned models generated using supervised learning data such as labeled examples. The labeled examples may be input into a machine learning system and the output from the machine learning system may be a machine-learned model that contains weights that are generated in response to the labeled data. The labeled examples may contain both an outcome and properties associated with a specific instance. It will be understood that the weights and outcomes may be unitless numerical values, percentages, counts of occurrences, or other quantification. A machine learning system may receive labeled data (e.g., labeled examples) to develop a machine-learned model that contains weights that are generated in response to the supervised labeled data. One or more rules may be created by a machine-learned model.

A rule can include an outcome, a set of features and a probability. For example, the rule:
(keyword:car, video:carmaker_1)→0.03
indicates that when a user submits a search keyword "car" at a search engine (a feature) and the user is presented with an video about carmaker_1 (the outcome), there is a 3% probability that the user will select the video to view it (the probability).

The entries in a searchable index can include documents and searchable tokens. A token in a machine-learned token-based index can be referred to as an indexed token. An indexed token may include a keyword or may not include a keyword. For example, an index can include one token that includes the keyword "car" as well as other tokens that do not include keywords but that relate to other features such as location, language and browser settings. In general, a feature can include any information known about a user, such as a query text submitted by the user, a browser configuration set by the user, etc. Also, a feature can be general state information such as the time of day, a geographic location, etc. For example, a webpage can be indexed to produce an entry as follows:

web_page_1: [text:boxcar, 4.0], [image:train, 2.0]

This indicates that a page of a website ("web_page_1", a document) includes the text string "boxcar" four times and two images of trains.

In accordance with an implementation of the disclosed subject matter, a standard rule-based machine-learned model can be decomposed into a set of documents and tokens with weights. For example, the following rules indicate the likelihood that a user who enters the search keyword "car" into a search engine will select a video about a particular carmaker:

(keyword:car, video:carmaker_1)→0.03
(keyword:car, video:carmaker_2)→0.05

These rules can be transformed into entries that include a set of searchable tokens corresponding to each video, such as:

carmaker_1: [keyword:car, 0.03]
carmaker_2: [keyword:car, 0.05]

An entry can include an outcome (such as "carmaker_1"), tokens (such as keyword:car) and a weight (such as 3%). The tokens can be based on the occurrence of features in a machine-learned rule. A weight can correspond to the probability that the outcome will occur based on the occurrence of certain features, represented here as tokens.

Since the data of the implementation has the same structure as a standard web search information retrieval problem, standard web search and other information retrieval techniques can be used, such as inverted indices and posting lists. An implementation thereby can eliminate the need for a separate information retrieval step and can effectively score all of the outcomes using the machine-learned model. In this way, search results can be provided that may be more appropriate to a user than a typical indexed search, for example that may be based on attributes of the user, context of the search, etc.

In an implementation, features can be associated with a given user. For example, the following table shows the presence (1) or absence (0) of features (query, user location (Europe, America) and whether the user has a high bandwidth connection) for Users A-D:

|  | Car | Europe | America | High Bandwidth |
| --- | --- | --- | --- | --- |
| User A | 0 | 0 | 1 | 1 |
| User B | 1 | 0 | 1 | 0 |
| User C | 0 | 1 | 0 | 1 |
| User D | 1 | 1 | 0 | 1 |

A machine-learned model can include weights that can indicate the relative contributions of various features to the likelihood of an outcome. For example, the table below shows the relative contributions of the features in the table above to the likelihood that a user will select for viewing a particular video A-D:

|  | Car | Europe | America | High Bandwidth |
| --- | --- | --- | --- | --- |
| Video A | 0.1 | 0.4 | 0.8 | 0.5 |
| Video B | 0.3 | 0.9 | 0.7 | 0.8 |
| Video C | 0.5 | 0.1 | 0.2 | 0.1 |
| Video D | 0.2 | 0.6 | 0.2 | 0.8 |

The presence or absence of a feature for a given user can be used with the weight of the feature for an outcome to determine the likelihood of that outcome for that user. For example, the presence of keyword:car and America for User B combined with the weights for those features for Video C (0.5 and 0.2, respectively) can be used to predict a probability that User B will select Video C for viewing. In similar fashion, the likelihood that each user will choose to view each different video can be calculated. It will be understood that the weights may be unitless numerical values, percentages, counts of occurrences, or other quantification.

Rules can be generated based on the machine-learned model. A rule can correlate at least one feature with a probability of occurrence of a given outcome. A number of rules can be generated based on the occurrences of various permutations of features.

In accordance with an implementation, a set of tokens can be generated based on the features in a rule. Examples of such tokens can include [keyword:car], [location:Europe] and [bandwidth:high]. A set of tokens corresponding to a set of features in a rule can be correlated with a probability of a given outcome and indexed. For example, the tokens [keyword:car], [location:Europe] and [bandwidth:high] can be correlated with a 4% probability that Video C will be selected to be viewed:

Video C: [keyword:car, location:Europe, bandwidth:high, 0.04]

This can be stored as a searchable index along with other such results derived from other rules. The compiled index can be easily searched using standard information retrieval tools. The generated index is referred to as a token-based index. The index is based on tokens that are not limited to keywords. Optionally, one or more ranking techniques can thereafter be employed to further refine the search results in response to a query.

The index can be used to consider only those tokens corresponding to features for a given user. For example, a search of the index can retrieve all videos for which probabilities have been calculated for a user whose last viewed video was about cats and whose location is America. The resulting videos can be ranked by probability from most to least likely to be selected next for viewing when presented as subsequent viewing options to the user. Descriptions (e.g., thumbnails) for the top-ranked videos in the list can be recommended to the user.

An outcome may be one for which the machine learning model predicted an outcome value. The value may be a weight, likelihood, or probability. By way of example only, we refer to probability herein. The outcome may be any applicable result such as a regression-based prediction, a ranking, a conversion probability, a click through probability, a duration prediction (e.g., how long a user is likely to view/interact with content associated with the outcome), or the like. As discussed in the previous example, a user viewing video Y and a user viewing the video Z are examples of outcomes. Other examples of outcomes may be selecting a link, selecting a promotion, opening an account, purchasing a product or service, the duration for which a user views a content (e.g., a video, an image, a text, etc.), repeat access (e.g., how likely a user is to revisit content), or the like.

An outcome probability may be represented in any useful form, including integer representations, Boolean categorization, normalization (e.g., the probability value converted into a normalized probability, conversion rate, percentage, etc.). It will be understood that an outcome probability may be any applicable prediction such as a percentage, ratio, or the like and/or may correspond to a prediction of amount spent (e.g., dollars spent), amount of exposure time (e.g., video minutes watched), or the like. As disclosed herein, the outcome probability may be derived from the prediction made by the machine learning model. As an example of an outcome probability, a searchable index may contain multiple entries, each associated with an outcome. Each entry may correspond to an outcome probability that predicts the likelihood of a user selecting the content associated with the outcome. Accordingly, the outcome probability may represent the percentage chance of a user selecting content associated with the outcome.

Notably, according to implementations of the disclosed subject matter, as shown in FIG. 1, a machine-learned model 110 may be trained based on training examples and features. A searchable token-based index 120 may be generated based on rules generated by the machine-learned model. The searchable token-based index 120 may be organized such that tokens associated with a query 130 may be matched with the tokens in the searchable token-based index 120 and, using a search algorithm, an outcome/outcomes 140 may be selected based on one or more outcome probabilities.

According to an implementation of the disclosed subject matter, a machine learning system may be used to generate and/or update models that are used to make predictions and/or provide rankings. An instance of a machine learning model-based prediction may contain an outcome, one or more features, and a prediction value. As an example of a prediction made via a machine learning model, multiple features for a given event may be provided to the machine learning model and, based on the presence of the features, the machine learning model may output a probability or prediction. As a more specific example, a machine learning model that predicts whether a user will view video Y (an example of an outcome) may be provided with features that the user located in the United States, has viewed a music video X in the past, and has set her default language as English (examples of features). The machine learning model may contain weights for each of the features (i.e., 0.5 for being located in the United States, 0.9 for having viewed music video X, and 0.3 for setting the default language as English). It will be understood that the machine learning model may contain weights for other features (e.g. the use is located in Canada) however, as those features are not present in this example prediction, their weights may not contribute to the prediction. Alternatively, the lack of presence of a particular feature may be important in predicting an outcome and may be taken into account. For example, the machine learning model may provide a weight for whether the user will view music video Y based on the absence of a feature (e.g., the user is not using a mobile device). The prediction value may be normalized to represent a percentage or probability in any applicable manner. Here the instance may contain the outcome: "whether the user will view video Y", the features: "located in the United States", "viewed video X", and "default language English", and the prediction: "0.9" (normalized).

A feature may be any applicable characteristic associated with an instance and may be based on a user (e.g., user demographic, user history, user associations such as user accounts or preferences), a device (e.g., a user device type, device features, device capabilities, device configuration etc.), a current event, or the like. Examples of features can include a user location, a user language preference, a view history, a user account, a user subscription, a device model type, a device screen resolution, a device operating system, a holiday designation, a sporting event occurrence, or the like. Additionally, as disclosed herein, a feature may be a search input (such as a text keyword, an image, an audio file, etc.) received from a user. It will be understood that the outcome, features, and/or the prediction may be represented in any useful form such as integer representations, via Boolean categorization, normalized (e.g., the probability value converted into a normalized probability, conversion rate, percentage, etc.). According to an implementation of the disclosed subject matter, the machine learning model may be trained using prior selections of one more users (outcomes), as disclosed herein. Notably, the prediction made by the machine learning model may be based on the successful selection or lack of selection of an outcome such that the predicted outcome probability may increase based on selected candidate results and may decrease based on unselected outcomes.

Figure 2A:
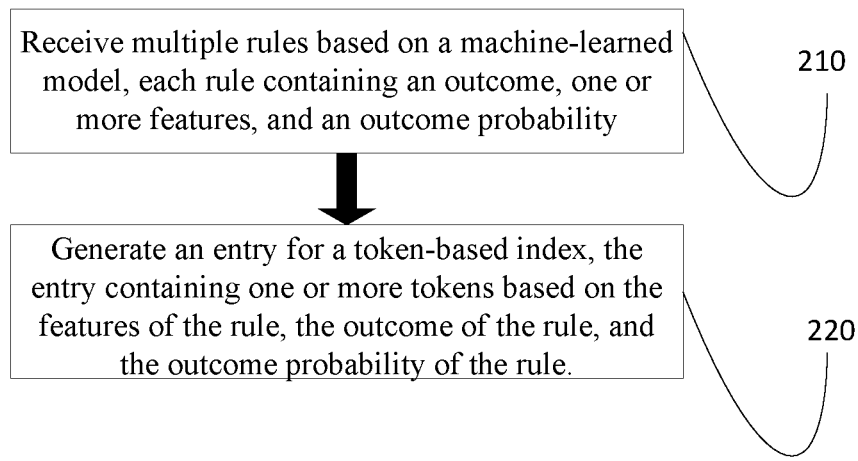
FIG. 2a shows an example process of generating a token-based index, according to an implementation of the disclosed subject matter.

According to an implementation of the disclosed subject matter, as shown in FIG. 2a, at step 210, multiple rules based on a machine learning model may be received. An instance of a machine learning model-based rule may contain an outcome, one or more features, and an outcome probability. As an example of a prediction made via a machine learning model, multiple features for a given event may be provided to the machine learning model and, based on the presence of the features, the machine learning model may output a probability or prediction. As a more specific example, a machine learning model that predicts whether a user will view video Y (an outcome) may be provided with data that the user located in the United States, has viewed a music video X in the past, and has set her default language as English (features). The machine learning model may prescribe weights for each of the features, e.g., 0.5 for being located in the United States, 0.9 for having viewed music video X, and 0.3 for setting the default language as English. Accordingly, the machine learning model may predict that the user will view music video Y with a weight of 1.7 based on the features associated with the rule. The probability value may be normalized to represent a percentage or probability in any applicable manner. Here the instance may contain the outcome: "whether the user will view video Y", the features: "located in the United States", "viewed video X", and "default language English", and the prediction: "0.9" (normalized). It will be understood that the outcome, features, and/or the probability may be represented in any applicable manner such as hash values, integer representations, Boolean categorization, normalization (e.g., the probability value converted into a normalized probability, conversion rate, percentage, etc.). As an example, an outcome for "Selecting video X" may be represented with a hash value "e0d123e5f316".

At step 220, an instance of a rule based on a machine learning model may be converted into an entry in a searchable feature based index. The entry in the searchable feature based index may contain an outcome associated with one or more tokens and an outcome probability. A token may be based on a feature contained within a rule. Continuing the previous example, the model may predict a probability of 0.9 for the outcome "the user will view video Y" based on various features. The token-based index may include the tokens location:US, viewed_video:X, and "language:English" correlated with the outcome "the user will view video Y" and a probability of 0.9. The token-based index may correlate the same tokens to other outcomes, each with its own probability. For example, the same tokens may be correlated to the outcome "the user will view video Z" with a probability of 0.8.

A searchable token-based index may be an inverted index or a posting list such that it is an index data structure that is configured to store a mapping from content (e.g., words, numbers, values, etc.) to locations in a database file, to documents, or a set of documents. The searchable token-based index may allow fast full text searches and may be a database file itself rather than its index.

Figure 2B:
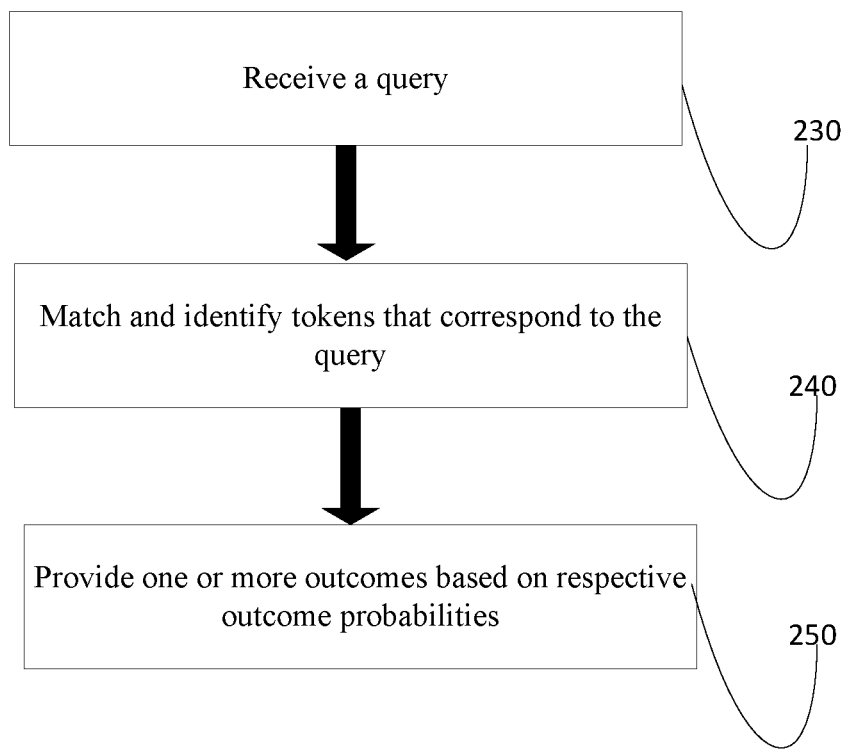
FIG. 2b shows an example process of searching a token-based index for outcomes based on outcome probabilities, according to an implementation of the disclosed subject matter.

At step 230, in FIG. 2b, a query may be received. A query may be generated based on an event caused by a human user, a computer, a database, software, an application, a server, or the like. As used herein, the term query may include any input that can be used to search the index to obtain a probabilities of one or more outcomes based on the occurrence of one or more events. For example, when a user selects a given video, the characteristics of the selection (e.g., identity of the video, topic of the video, location of the user, etc.) can be used as the basis of a query to search the index for outcomes and their respective probabilities that the user will select other videos to watch next. The results of the query can predict, for example, that the user will select Video B with a probability of 0.2, Video C with a probability of 0.1 and Video D with a probability of 0.4.

In an implementation, a query can be formulated based on a subset of tokens that may be identified, step 240, e.g., based on an event. For example, a keyword search for "car" may have been submitted by a user in Canada at 5:07 PM ET with the language setting of the user's browser set to "French." The subset of tokens that may be identified can include keyword:car, location:Canada, time:5:07 PMET and language:French. These tokens can be used to search the index for outcomes and probabilities correlated with the same or similar tokens in the index, step 250. For example, the tokens associated with a query may be:

| keyword: car | location: USA | bandwith: high |
|---|---|---|

These tokens may correspond, for example, to the following entries in the index, which can efficiently be retrieved using standard index search techniques:

| Video ID | Tokens associated with entry | | | % |
|---|---|---|---|---|
| Video A | keyword: car | location: USA | bandwith: high | 45 |
| Video C | keyword: car | location: USA | bandwith: high | 24 |
| Video F | keyword: car | location: USA | bandwith: high | 76 |
| Video R | keyword: car | location: USA | bandwith: high | 55 |

One or more outcomes (above, videos) may be selected from the above results, e.g., based on their respective outcome probabilities. As shown above, the outcome Video F has the highest probability of being selected for viewing next. Accordingly, a link to Video F may be provided to a user. Similarly the next highest-ranked (most probable) videos (Video R and Video A) may also be presented.

Figure 3:
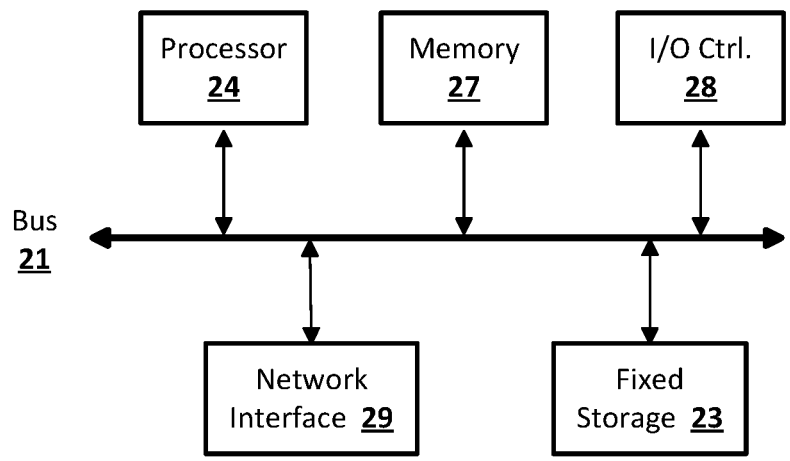
FIG. 3 shows a computer according to an implementation of the disclosed subject matter.

Implementations of the presently disclosed subject matter may be implemented in and used with a variety of component and network architectures. FIG. 3 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) that controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 4.

Many other devices or components (not shown) may be connected in a similar manner, such as document scanners, digital cameras, auxiliary, supplemental, or backup systems, or the like. Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 4:
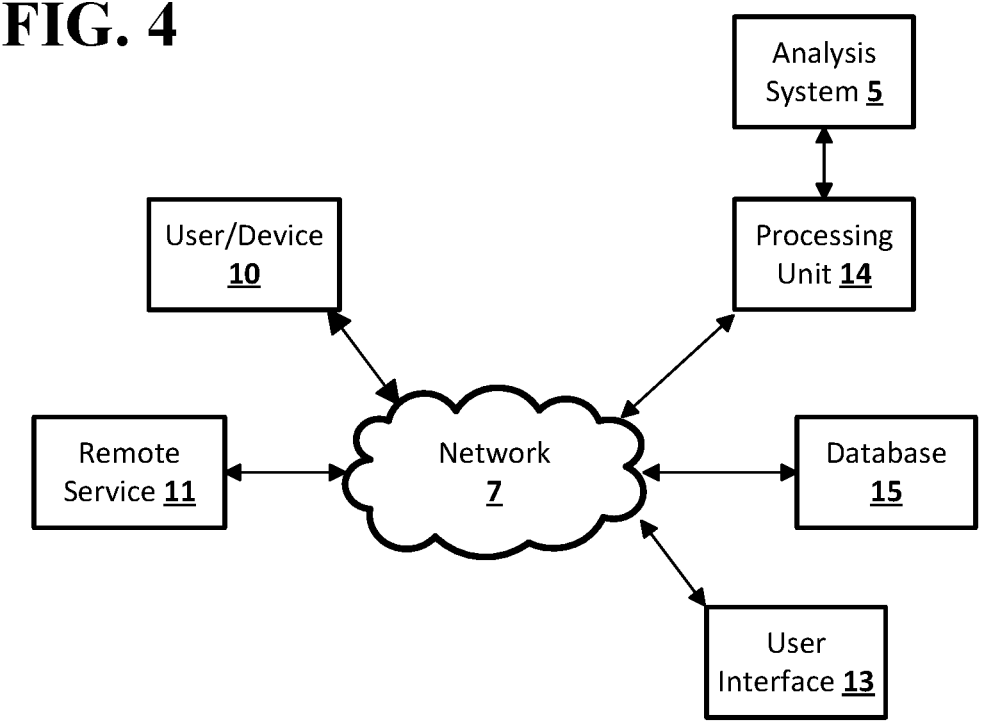
FIG. 4 shows a network configuration according to an implementation of the disclosed subject matter.

FIG. 4 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

In situations in which the implementations of the disclosed subject matter collect personal information about users, or may make use of personal information, the users may be provided with an opportunity to control whether programs or features collect user information (e.g., a user's performance score, a user's work product, a user's provided input, a user's geographic location, and any other similar data associated with a user), or to control whether and/or how to receive instructional course content from the instructional course provider that may be more relevant to the user. In addition, certain data may be treated in one or more ways before it is stored or used, so that personally identifiable information is removed. For example, a user's identity may be treated so that no personally identifiable information can be determined for the user, or a user's geographic location associated with an instructional course may be generalized where location information is obtained (such as to a city, ZIP code, or state level), so that a particular location of a user cannot be determined. Thus, the user may have control over how information is collected about the user and used by an instructional course provider.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method, comprising:
before receiving, at a search system, a subsequent query that is associated with at least one or more features:
generating, using a predictive model and by the search system, data indicating a predicted relevance of a particular item of content to a query that is associated with the one or more features, wherein the predicted relevance is generated by the predictive model based at least on the one or more features; and
storing, by the search system and in a record entry of a database for a search index, data that associates the particular item of content and the one or more features with the data indicating the predicted relevance generated by the predictive model;
receiving, at the search system, the subsequent query that is associated with at least the one or more features;
in response to receiving the subsequent query:
accessing, by the search system, the record entry of the database for the search index to identify the particular item and the predicted relevance that was previously generated by the predictive model based at least on the one or more features associated with the subsequent query;
selecting, using the predicted relevance, the particular item of content; and
providing data identifying the particular item of content in response to the subsequent query.

2. The method of claim 1, wherein the particular item is a video, document, advertisement, image, or an audio file.

3. The method of claim 1, in response to receiving the subsequent query, further comprising:
selecting, by the search system, a subset of search results that each identify a respective item of content from items of content, the subset of search results including a particular search result identifying the particular item of content; and
ranking, by the search system, the subset of search results based on predicted relevancies for the items of content identified by the search results.

4. The method of claim 1, wherein at least the one or more features of the subsequent query comprises a location of a device that transmitted the subsequent query, a language of the subsequent query, and a time of day.

5. The method of claim 1, wherein each search result is indexed in the search index by a token, and the token comprises a description of a feature of the particular item associated with the predicted relevance of selecting the particular item.

6. The method of claim 1, further comprising:
training, by the search system, the predictive model using training data that associates a selection of a particular item of content with one or more corresponding features.

7. The method of claim 1, in response to receiving the subsequent query, further comprising:
determining a context of the subsequent query based on characteristics of the selection of the particular item of content, wherein the characteristics are related to an identity of the particular item of content or a topic of the particular item of content.

8. The method of claim 1, wherein the predicted relevance is a likelihood that the particular item of content will be selected by a user in response to submitting a search query associated with the one or more features.

9. A system comprising:
one or more computers and one or more storage devices storing instructions that are operable, when executed by the one or more computers, to cause the one or more computers to perform operations comprising:
before receiving, at a search system, a subsequent query that is associated with at least one or more features:
generating, using a predictive model and by the search system, data indicating a predicted relevance of a particular item of content to a query that is associated with the one or more features, wherein the predicted relevance is generated by the predictive model based at least on the one or more features; and storing, by the search system and in a record entry of a database for a search index, data that associates the particular item of content and the one or more features with the data indicating the predicted relevance generated by the predictive model;

receiving, at the search system, the subsequent query that is associated with at least the one or more features;

in response to receiving the subsequent query:
accessing, by the search system, the record entry of the database for the search index to identify the particular item and the predicted relevance that was previously generated by the predictive model based at least on the one or more features associated with the subsequent query;

selecting, using the predicted relevance, the particular item of content; and providing data identifying the particular item of content in response to the subsequent query.

10. The system of claim 9, wherein the particular item is a video, document, advertisement, image, or an audio file.

11. The system of claim 9, in response to receiving the subsequent query, further comprising:
selecting, by the search system, a subset of search results that each identify a respective item of content from items of content, the subset of search results including a particular search result identifying the particular item of content; and ranking, by the search system, the subset of search results based on predicted relevancies for the items of content identified by the search results.

12. The system of claim 9, wherein at least the one or more features of the subsequent query comprises a location of a device that transmitted the subsequent query, a language of the subsequent query, and a time of day.

13. The system of claim 9, wherein each search result is indexed in the search index by a token, and the token comprises a description of a feature of the particular item associated with the predicted relevance of selecting the particular item.

14. The system of claim 9, further comprising:
training, by the search system, the predictive model using training data that associates a selection of a particular item of content with one or more corresponding features.

15. The system of claim 9, in response to receiving the subsequent query, further comprising:
determining a context of the subsequent query based on characteristics of the selection of the particular item of content, wherein the characteristics are related to an identity of the particular item of content or a topic of the particular item of content.

16. The system of claim 9, wherein the predicted relevance is a likelihood that the particular item of content will be selected by a user in response to submitting a search query associated with the one or more features.

17. A non-transitory computer-readable medium storing software comprising instructions executable by one or more computers which, upon such execution, cause the one or more computers to perform operations comprising:
before receiving, at a search system, a subsequent query that is associated with at least one or more features:
generating, using a predictive model and by the search system, data indicating a predicted relevance of a particular item of content to a query that is associated with the one or more features, wherein the predicted relevance is generated by the predictive model based at least on the one or more features; and storing, by the search system and in a record entry of a database for a search index, data that associates the particular item of content and the one or more features with the data indicating the predicted relevance generated by the predictive model;

receiving, at the search system, the subsequent query that is associated with at least the one or more features;

in response to receiving the subsequent query:
accessing, by the search system, the record entry of the database for the search index to identify the particular item and the predicted relevance that was previously generated by the predictive model based at least on the one or more features associated with the subsequent query;

selecting, using the predicted relevance, the particular item of content; and providing data identifying the particular item of content in response to the subsequent query.

18. The non-transitory computer-readable medium of claim 17, the particular item is a video, document, advertisement, image, or an audio file.

19. The non-transitory computer-readable medium of claim 17, in response to receiving the subsequent query, further comprising: selecting, by the search system, a subset of search results that each identify a respective item of content from items of content, the subset of search results including a particular search result identifying the particular item of content; and ranking, by the search system, the subset of search results based on predicted relevancies for the items of content identified by the search results.

20. The non-transitory computer-readable medium of claim 17, wherein at least the one or more features of the subsequent query comprises a location of a device that transmitted the subsequent query, a language of the subsequent query, and a time of day.

* * * * *